United States Patent
Lee et al.

(10) Patent No.: US 8,285,444 B2
(45) Date of Patent: Oct. 9, 2012

(54) INTEGRATED VEHICLE CONTROL SYSTEM

(75) Inventors: Jae Kwan Lee, Gyeonggi-do (KR);
Jong Dae Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 533 days.

(21) Appl. No.: 12/533,104

(22) Filed: Jul. 31, 2009

(65) Prior Publication Data

US 2010/0145549 A1    Jun. 10, 2010

(30) Foreign Application Priority Data

Dec. 5, 2008  (KR) .................... 10-2008-0123124

(51) Int. Cl.
*G06F 7/00* (2006.01)
(52) U.S. Cl. ....... 701/36; 701/29.1; 701/32.8; 701/32.9; 701/33.6; 701/33.7; 340/536; 340/538.12; 340/12.34

(58) Field of Classification Search .............. 701/32.8, 701/32.9, 33.6, 33.7, 33.9, 34.1; 340/536, 340/538.12, 12.34
See application file for complete search history.

(56) References Cited

U.S. PATENT DOCUMENTS

| | | | |
|---|---|---|---|
| 6,988,026 B2 * | 1/2006 | Breed et al. ................. | 701/31.4 |
| 2005/0273218 A1 * | 12/2005 | Breed et al. ................. | 701/2 |
| 2006/0212193 A1 * | 9/2006 | Breed ............................ | 701/29 |

FOREIGN PATENT DOCUMENTS

JP      2006-007823 A      1/2006

* cited by examiner

*Primary Examiner* — Redhwan k Mawari
(74) *Attorney, Agent, or Firm* — Edwards Wildman Palmer LLP; Peter F. Corless

(57) ABSTRACT

Disclosed herein is an integrated vehicle control system, which eliminates the possibility of interfering with motion control devices and is capable of accurately controlling the targeted behavior of a vehicle.

6 Claims, 3 Drawing Sheets

INTEGRATED VEHICLE CONTROL SYSTEM

CROSS-REFERENCE TO RELATED APPLICATIONS

This application claims under 35 U.S.C. §119(a) priority to Korean Application No. 10-2008-0123124, filed on Dec. 5, 2008, the disclosure of which is incorporated herein by reference in its entirety.

BACKGROUND OF THE INVENTION

1. Field of the Invention

The present invention relates to an integrated vehicle control system which actively controls the behavior of a vehicle on the basis of a full vehicle dynamic model (hereinafter referred to as a 'full vehicle model').

2. Description of the Related Art

To date, concerns related to electronic chassis control systems have been mainly concentrated on the development of independent technologies related to the braking, suspension, driving and steering, and the optimization of the performance of the electronic chassis control system with respect to the respective sub-systems.

Since motion control devices provided to the sub-systems, in particular, different sub-systems, have different purposes and functions and occasionally have mechanical connections, mutual interference inevitably occurs therebetween. In order to avoid a possibility of such interference and maximize the independent effects of respective motion control devices, there is a need to bring about the interaction and interoperability between respective motion control devices.

In order to bring about this interaction and interoperability, cooperative control may be taken into consideration. Such cooperative control is implemented in such a way that, for example, when cooperation with the Electronic Power Steering (EPS) of a steering system is required during a process in which the Electronic Stability Control (ESC) of a braking system controls the behavior of a vehicle, the EPS suitably performs required control in response to a necessary control request signal if the ESC transmits the control request signal via Controller Area Network (CAN) communication.

However, the above-described cooperative control needs rules and control algorithms required for the interaction and coordination between various types of motion control devices. First, as the number of systems to be integrated increases, the number of variables to be considered increases as well, and the construction of a cooperative control system becomes complicated. Second, when coordination between a replaced or additionally installed motion control device and other motion control devices is not accurately conducted, a control request signal from the replaced or additional motion control device is suitably determined to be disturbance by other motion control devices, so that control opposing the control request signal is performed, thus deteriorating the control performance of a cooperative control system.

The above information disclosed in this the Background section is only for enhancement of understanding of the background of the invention and therefore it may contain information that does not form the prior art that is already known in this country to a person of ordinary skill in the art.

SUMMARY OF THE INVENTION

Accordingly, to the present invention, in one aspect, provides an integrated vehicle control system which suitably eliminates the possibility of interference between motion control devices and is capable of accurately controlling the targeted behavior of a vehicle.

Preferably, the present invention provides an integrated vehicle control system, comprising a sensor unit for suitably obtaining information about a vehicle and peripheral information; a plurality of actuators for suitably controlling behavior of the vehicle; an integrated control unit for suitably calculating control target values for one or more of the actuators, based on the vehicle information and the peripheral information received from the sensor unit; a coordinator for suitably performing feedforward decoupling control so that possible interference components that may occur on the actuators due to the control target values offset each other; and a driving unit for suitably converting values output from the coordinator into drive values for the respective actuators.

Preferably, the coordinator may include suitable feedforward parameters required to offset mutual interference components between the actuators that may interfere with each other.

Preferably, the integrated control unit may be suitably configured based on the full vehicle model.

Preferably, the integrated control unit may suitably perform feedback control to detect results of control through the actuators.

Preferably, the driving unit may comprise suitable driving elements included in installation regions of the respective actuators, the driving elements preferably being operated autonomously in parallel with each other.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

As described herein, the present invention includes an integrated vehicle control system, comprising a sensor unit for obtaining information about a vehicle, one or more actuators, an integrated control unit, a coordinator, and a driving unit.

In one embodiment, the sensor unit is further used for obtaining peripheral information.

In another embodiment, the one of more actuators are used for controlling behavior of the vehicle.

In another related embodiment, the integrated control unit is used for calculating control target values for one or more of the actuators.

In still another further embodiment, calculating control target values is based on the vehicle information and the peripheral information received from the sensor unit.

In another embodiment, the coordinator is used for performing feedforward decoupling control so that possible interference components that may occur on the actuators due to the control target values offset each other.

In a further related embodiment, the driving unit is used for converting values output from the coordinator into drive values for the respective actuators.

The invention also features a motor vehicle comprising the integrated vehicle control system as described in any one of the aspects herein.

Hereinafter, embodiments of an integrated vehicle control system according to the present invention will be described in detail with reference to the attached drawings.

Figure 1:
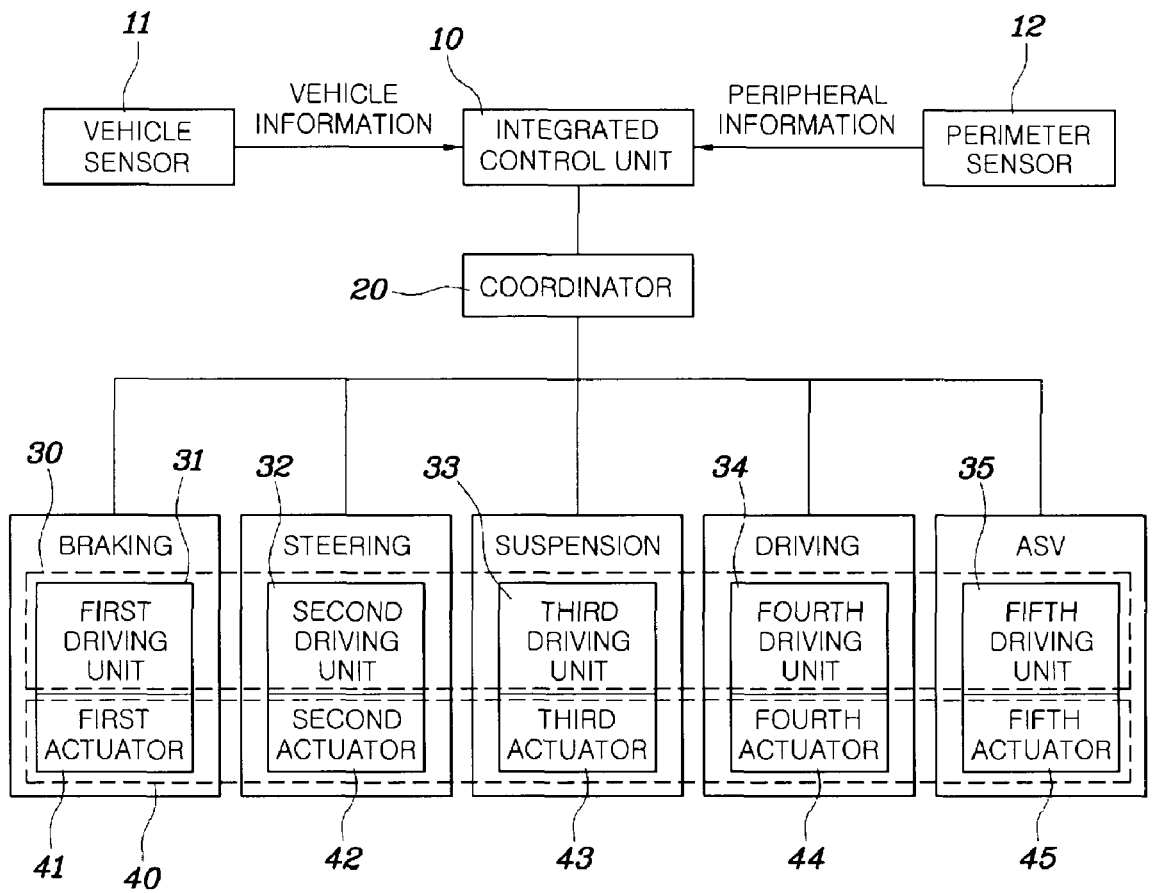
FIG. 1 is a diagram showing the construction of an integrated vehicle control system according to an embodiment of the present invention.

In one preferred embodiment, referring, for example to FIG. 1, an integrated vehicle control system according to an embodiment of the present invention preferably includes an integrated control unit 10 for calculating target control values required for the control of the behavior of a full vehicle on the basis of information about the vehicle and peripheral information, and a coordinator 20 for suitably performing decoupling control, and preferably further includes an actuator unit 40 and a driving unit 30.

According to another preferred embodiment, perimeter sensors 12 for obtaining the peripheral information, together with vehicle sensors 11 for obtaining the vehicle information, are suitably integrated into the system of the present invention. Preferably, the vehicle sensors 11 include typical sensors in the vehicle, such as, but not limited to, a velocity sensor, a brake sensor, and a throttle sensor. In further preferred embodiments, the perimeter sensors 12 include various sensors for suitably detecting the surroundings of the vehicle, such as, but not limited to, an ultrasonic sensor, a radar sensor, and a vision sensor. Preferably, the perimeter sensors 12 are included in the system in this way, and thus an integrated vehicle control system additionally having an active safety function based on the perimeter sensors 12 may be suitably implemented.

Figure 2:
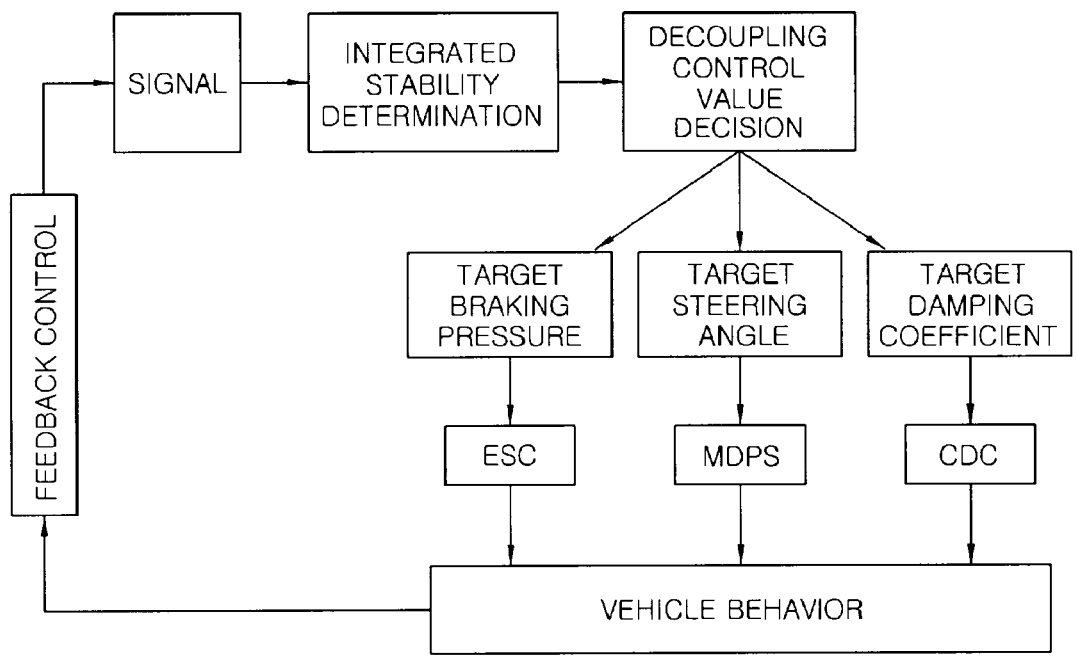
FIG. 2 is a diagram showing the operating flow of an integrated vehicle control system according to an embodiment of the present invention.

In certain exemplary embodiments, for example as shown in FIGS. 1 and 2, the integrated control unit 10 is suitably configured based on a full vehicle model, and suitably defines individual functions and target performances of actuators required to suitably achieve control targets (for example, but not limited to, design requirements for combining travel stability, convenience, promptness, etc.) from the standpoint of vehicle dynamics. Preferably, such an integrated control unit 10 suitably executes a feedback control algorithm required to determine integrated stability based on the vehicle information and the peripheral information and suitably derive optimal vehicle behavior (e.g., vehicle performance).

According to other further embodiments of the invention, the coordinator 20 preferably executes a feedforward control algorithm (which will be described later) for suitably decoupling the respective actuators 41 to 45 of the actuator unit 40 so as to solve the problem of interference between the actuators 41 to 45 (that is, according to certain exemplary embodiments, the deterioration of control performance from the standpoint of a full vehicle) which result from the results obtained by the integrated control unit 10. In related exemplary embodiments, the target control based on the results of the determination of integrated stability by the integrated control unit 10 is suitably executed or performed by decoupling control values decided on by the coordinator 20.

Preferably, the driving unit 30 suitably converts values output from the coordinator 20 (that is, the decoupling control values) into drive values required to drive the actuators 41 to 45, for example, but not limited to, the ESC of a braking system, the EPS of a steering system, and the Continuous Damping Control (CDC) of a suspension system. Preferably, these drive values may be braking pressure in the case of the ESC, steering angle or steering torque in the case of the EPS, and a damping coefficient in the case of the CDC. In further preferred embodiments, such a driving unit 30 preferably includes driving elements 31 to 35 included in respective installation areas of the actuators 41 to 45, and such driving elements 31 to 35 are suitably operated autonomously in parallel with each other.

According to further preferred embodiments of the invention, the actuators 41 to 45 control the behavior of the vehicle in response to the drive values, and the results of control are preferably fed back into the integrated control unit 10. As shown in FIG. 1, for example, according to this embodiment, the actuator 45 used in an Advanced Safety Vehicle (hereinafter referred to as an 'ASV') is suitably integrated into the integrated vehicle control system.

In further preferred embodiments of the invention, and with reference to FIG. 3, for example, possible mutual interference between the sub-systems, occurring when, for example, braking, steering and suspension systems are suitably simultaneously operated in a target vehicle, is described below. For example, in FIG. 3, decoupling control according to the embodiment of the present invention is not performed.

Figure 3:
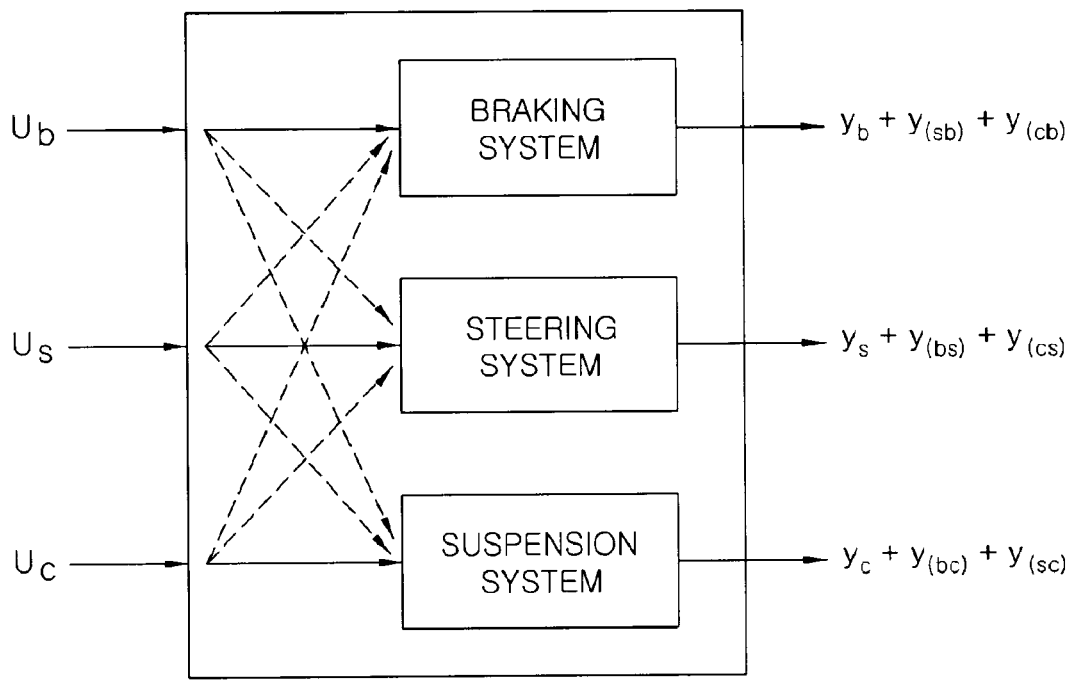
FIG. 3 is a diagram showing a problem occurring when the decoupling control of an integrated vehicle control system is not performed according to an embodiment of the present invention.

In FIG. 3, $u_b$, $u_s$ and $u_c$ are, respectively, an input value required for the suitable control of a braking system, an input value required for the suitable control of a steering system, and an input value required for the suitable control of a suspension system. In further preferred embodiments, $y_{(bs)}$ and $y_{(bc)}$ are physical quantities influencing other sub-systems (steering and suspension systems) due to the input $u_b$, $y_{(sb)}$ and $y_{(sc)}$ are physical quantities influencing other sub-systems (braking and suspension systems) due to the input $u_s$, and $y_{(cb)}$ and $y_{(cs)}$ are physical quantities influencing other sub-systems (braking and steering systems) due to the input $u_c$.

According to other preferred embodiments and as shown in FIG. 3, when it is assumed that, as an example, $u_b$ is suitably input to the braking system, $u_b$ acts as an internal factor (or an affirmative factor) generating the required output $y_b$ of the braking system, and also acts as suitable external factors (or negative factors) resulting in interference components $y_{(bs)}$ and $y_{(bc)}$ for the steering and suspension systems. Preferably, in further embodiments, the control target of the braking system is suitably output $y_b$ corresponding to $u_b$, but, actually, the braking system further outputs an amount of undesired interference of $y_{(sb)}+y_{(cb)}$ because of $u_s$ and $u_c$ respectively input to the steering system and the suspension system. Preferably, when respective systems are not decoupled, a control value input to any one system acts as a suitable disturbance to other systems. Preferably, the coordinator according to the preferred embodiment is derived from awareness of this problem.

In further preferred embodiments and with reference to FIG. 4, decoupling control using the coordinator 20 will be described in detail.

Preferably, when a vehicle deviates from an initial state immediately following the starting of the vehicle, and enters a steady state in which the systems of the vehicle are suitably stabilized, the following input/output equations may preferably be established with respect to, for example, the braking, steering and suspension systems.

[Braking System]

$$y_{(sb)\_ss} = k_{(sb)} \times u_{s\_ss} \quad (1)$$

$$y_{(cb)\_ss} = k_{(cb)} \times u_{c\_ss} \quad (2)$$

where $u_{s\_ss}$ and $u_{c\_ss}$ are the input values of the steering system and the suspension system, respectively, in the steady state, that is, the input values of systems other than the braking system. Preferably, in further embodiments, $y_{(sb)\_ss}$ and $y_{(cb)\_ss}$ are physical quantities suitably influencing the braking system due to the input values $u_{s\_ss}$ and $u_{c\_ss}$, and $k_{(sb)}$ and $k_{(cb)}$ are the control parameters of the braking system obtained based on the full vehicle model.

[Steering System]

$$y_{(bs)\_ss} = k_{(bs)} \times u_{b\_ss} \quad (3)$$

$$y_{(cs)\_ss} = k_{(cs)} \times u_{c\_ss} \quad (4)$$

where $u_{b\_ss}$ and $u_{c\_ss}$ are the input values of the braking and suspension systems, respectively, in a steady state, that is, the input values of systems other than the steering system. Further, $y_{(bs)\_ss}$ and $y_{(cs)\_ss}$ are physical quantities suitably influencing the steering system due to the input values $u_{b\_ss}$ and $u_{c\_ss}$, and $k_{(bs)}$ and $k_{(cs)}$ are the control parameters of the steering system obtained based on the full vehicle model.

[Suspension System]

$$y_{(bc)\_ss} = k_{(bc)} \times u_{b\_ss} \quad (5)$$

$$y_{(sc)\_ss} = k_{(sc)} \times u_{s\_ss} \quad (6)$$

where $u_{b\_ss}$ and $u_{s\_ss}$ are the input values of the braking and steering systems, respectively, in a steady state, that is, the input values of systems other than the suspension system. Further, $y_{(bc)\_ss}$ and $y_{(sc)\_ss}$ are physical quantities suitably influencing the suspension system due to the input values $u_{b\_ss}$ and $u_{s\_ss}$, and $k_{(bc)}$ and $k_{(sc)}$ are the control parameters of the suspension system obtained based on the full vehicle model.

Preferably, in above Equations (1) to (6), the control parameters may be suitably obtained from the correlation between the input values and the output values. For example, in certain preferred embodiments, when an assumption that no values are input to other systems in the case where the braking system outputs $y_{(bs)\_ss}$ for the input $u_{s\_ss}$ in a steady state is made, it is possible to obtain the control parameter $k_{(sb)}$. Accordingly, when the control parameters are definitely defined or suitably set in conformity with the dynamics characteristics of a control target vehicle, each decoupling control value from which interference components attributable to the input values of other systems suitably offset each other in advance using the control parameters can be decided on, as will be described later. It should be understood that, in accordance with certain preferred embodiments of the invention, when the control parameters are known, it is possible to suitably obtain an output value y for a certain input value u, or to obtain an input value u required to obtain a certain output value y.

Figure 4:
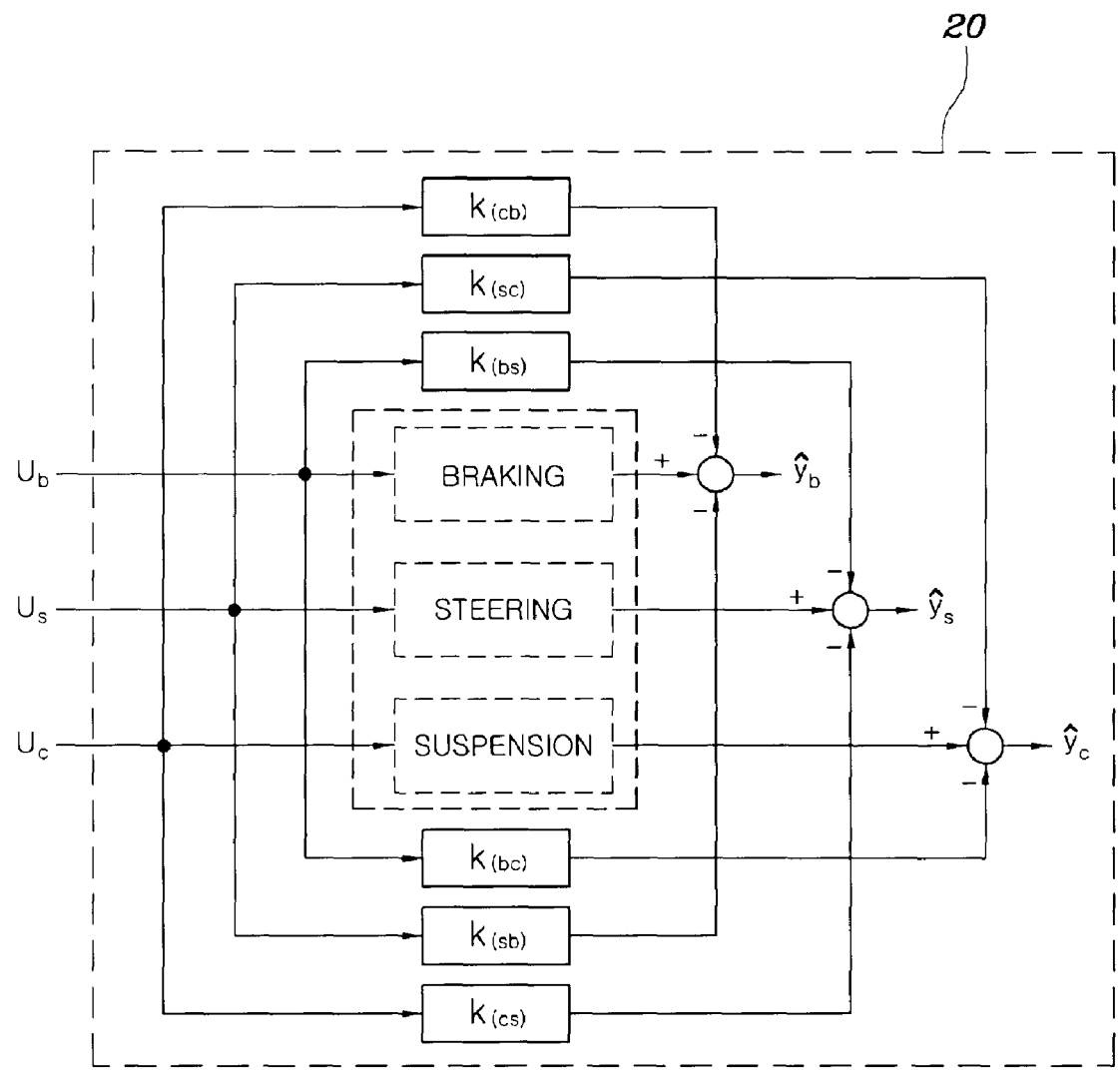
FIG. 4 is a diagram showing the decoupling control method of an integrated vehicle control system according to an embodiment of the present invention.

According to other further embodiments and as shown in FIG. 4, $k_{(sb)}$ and $k_{(cb)}$ are feedforward control parameters required to suitably offset the interference components of the steering and suspension systems, respectively, in the braking system. $k_{(bs)}$ and $k_{(cs)}$ are feedforward control parameters required to offset the interference components of the braking and suspension systems in the steering system. $k_{(bc)}$ and $k_{(sc)}$ are feedforward control parameters required to offset the interference components of the braking and steering systems in the suspension system. Preferably, these feedforward control parameters suitably correspond to the control parameters of the systems in the steady state, as described above with reference to FIG. 3, that is, the control parameters of the systems suitably obtained based on the full vehicle model.

According to still further preferred embodiments and as shown in FIG. 4, when $u_b$, $u_s$ and $u_c$ are suitably input to the braking, steering and suspension systems, respectively, these input values act as disturbances on systems other than target systems which are control targets, as described above, thus resulting in interference with the relevant systems. Therefore, in order to avoid this interference, there is a need to output control values capable of offsetting in advance interference using the feedforward control parameters, that is, decoupling control values, from the coordinator 20 to the systems.

For example, in certain preferred embodiments, since $u_s$ and $u_c$ input to the steering and suspension systems act as suitably interfering factors on the braking system, the coordinator 20 outputs a decoupling control value $\hat{y}_b$ to which a control component corresponding to $u_b$ expected for the braking system is added and from which interference components unexpected for the braking system, for example, $u_s \times k_{(sb)}$ and $u_c \times k_{(cb)}$ are subtracted, in order to offset the interfering factors. In this case, interference components acting on the braking systems due to $u_s$ and $u_c$ input to the steering and suspension systems are considered in and subtracted in advance from the decoupling control value, and thus the same effect as that obtained when interference attributable to $u_s$ and $u_c$ is not present is actually realized.

In other embodiments of the invention, in order to suitably guarantee optimal travel safety, stability and convenience, interest in an integrated vehicle control system in which an integrated chassis control system for preferably controlling the sub-systems of a chassis system in an integrated manner is suitably integrated with an active safety system for preventing collisions with a vehicle has gradually increased. According to further preferred embodiments, an Advanced Safety Vehicle (hereinafter referred to as an 'ASV') is a preferred example of the active safety system. According to a preferred embodiment in which the coordinator suitably outputs a control signal required to offset interference components, it is possible to implement an integrated vehicle control system in which an integrated chassis control system is suitably integrated with an active safety system.

According to the above-described integrated vehicle control system, interference between actuators for suitably controlling the behavior of a vehicle may be prevented, and the targeted behavior of a vehicle may be accurately controlled.

In further preferred embodiments, the integrated vehicle control system is advantageous in that, since it is designed based on a full vehicle model, control performance can preferably be optimized based on an optimal control theory, and the structure of the integrated vehicle control system is much less complicated than that of a cooperative control system even if the number of systems to be integrated has suitably increased.

Preferably, according to the integrated vehicle control system, interference components between actuators offset each other, so that the actuators are suitably decoupled, thus increasing adaptability to circumferential variation such as the replacement or addition of driving units and/or actuators.

Preferably, the integrated vehicle control system may be suitably implemented using a single Electronic Control Unit (ECU).

Preferably, according to the integrated vehicle control system, an active safety function based on information obtained by perimeter sensors is suitably added, thus also improving travel safety and convenience.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An integrated vehicle control system, comprising:
   a sensor unit configured to obtain information about a vehicle and peripheral information;
   a plurality of actuators configured to control behavior of the vehicle;
   an integrated control unit configured to calculate control target values for one or more of the actuators, based on the vehicle information and the peripheral information received from the sensor unit;
   a coordinator configured to (i) perform feedforward decoupling control so that possible interference components that may occur on the actuators due to the control target values offset each other wherein the coordinator includes one or more feedforward parameters required to offset mutual interference components between the actuators that may interfere with each other, the one or more feedforward parameters corresponding to control parameters of the respective actuators obtained based on a full vehicle model and (ii) output to the driving unit a decoupling control value to which a control target is added, wherein the control target is a control component corresponding to a control input value expected for a target actuator, and from which interference unexpected components are subtracted in advance from the decoupling control value, wherein the interference unexpected components are attributable to control input values of actuators other than the target actuator; and
   a driving unit configured to convert values output from the coordinator into drive values for the respective actuators.

2. The integrated vehicle control system according to claim 1, wherein the integrated control unit is configured based on the full vehicle model.

3. The integrated vehicle control system according to claim 2, wherein the integrated control unit performs feedback control to detect results of control through the actuators.

4. The integrated vehicle control system according to claim 1, wherein the driving unit comprises driving elements included in installation regions of the respective actuators, the driving elements being operated autonomously in parallel with each other.

5. The integrated vehicle control system according to claim 4, wherein the plurality of actuators comprises an actuator used for an Advanced Safety Vehicle (ASV).

6. A motor vehicle comprising the integrated vehicle control system of claim 1.

* * * * *